Patented May 15, 1945

2,376,309

UNITED STATES PATENT OFFICE 2,376,309

DEHYDROGENATION OF MENTHANE

James K. Dixon, Riverside, Conn., assignor to American Cyanamid Company, New York, N. Y., a corporation of Maine No Drawing. Application June 23, 1943, Serial No. 491,938

7 Claims. (Cl. 260—669)

This invention relates to the dehydrogenation of menthane. More particularly, the invention relates to a process whereby p-menthane is converted to dimethyl styrene in the vapor phase by catalysis.

It is well known, as shown for example in my copending application, Serial No. 471,875, filed January 9, 1943, of which the present application is a continuation-in-part, that in the vapor phase conversion of monocyclic terpenes such as dipentene to cymene an appreciable amount of p-menthane is formed. It has now been found that in converting a terpene to dimethyl styrene, as in my copending applications, Serial Nos. 491,939 and 491,940, filed of even date; a similar production of menthane occurs.

This menthane formation is undesirable since formation of menthane represents a direct loss in potential product. However, it appears in most cases to be substantially impossible to prevent some menthane formation. The exact mechanism which produces this result is not fully understood. Presumably, it is due to the equilibrium conditions which exist between the materials in the conversion chamber. Since, as pointed out, the formation of menthane can not be wholly prevented it is desirable to take advantage of the fact by finding some method of converting the menthane per se to a more desirable product.

It is, therefore, the principal object of the present invention to develop a suitable process whereby a menthane such as p-menthane may be directly converted to a useful product such as 4-methyl,alpha-methyl styrene, more commonly designated simply as dimethyl styrene. In the past, such a process has been considered to be distinctly impractical, if not impossible, due to the well known tendency of menthanes to crack when heated to produce a mixture principally composed of benzene, toluene, xylene and isoprene.

Despite the predictions based on the prior art, I have now found that p-menthane can be dehydrogenated to produce a good yield of dimethyl styrene. In general, this is carried out by passing vaporized p-menthane over a suitable catalyst at elevated temperatures.

When the reaction is carried out according to the process of the present invention, a conversion of a major portion of the menthane to more useful products is readily obtained, with a liquid recovery of from 80–90% based on the material fed and recovered. In one pass over the catalyst, p-cymene may be isolated in yields of from 20–35% and dimethyl styrene may be isolated in yields up to about 20%, or more. While particularly useful in conjunction with the preparation of cymene or dimethyl styrene, as in the processes of my previously-mentioned copending applications, the present process is not so limited. It is equally applicable to p-menthane however formed.

To be suitable for use in the process of the present invention, a catalyst must have certain specific properties. Primarly it must be able to accomplish the necessary dehydrogenation and yield the desired products, preferably a maximum of dimethyl styrene. On the other hand, it must accomplish the dehydrogenation without the excessive cracking which in the past has been the expected result of heating menthane in contact with a catalyst. Preferably, the catalyst should also be one which has a long active life, is capable of being readily reactivated and is sufficiently physically strong to withstand handling.

As pointed out, it would not be so expected from the prior art but surprisingly, the reaction can be carried out catalytically in the vapor phase. Even more unexpectedly, it was found that by properly controlling the contact time and the temperature, metal oxides, difficultly-reducible under the operating conditions, were the most satisfactory catalysts. Among the oxides found most suitable for use in the present invention are those of chromium, molybdenum and vanadium. This is particularly surprising in view of the fact that these are the same materials which were used as catalysts in my previously-mentioned processes in which menthane was produced at the expense of desired yields of dimethyl styrene. The oxides of such metals as copper, zinc, and the alkali and alkaline earth metals should in general be avoided as they tend to induce undesirable cracking at the expense of the yield.

While the oxides may be used per se as catalysts, they are usually quite fragile and require careful handling. As a result it is preferable to use the oxide on a support or carrier. The nature of the support on which the oxide is deposited appears to affect the activity of the catalyst mass as a whole. While satisfactory results have been obtained using alumina or bauxite as a support it has been found that best results were obtained using commercial "Activated" Alumina, as prepared, for example, according to the processes illustrated in U. S. Patents 1,868,869 and 2,015,593. Clays such as kaolin and the like which have a high content of $SiO_2$ should be avoided since they generally appear to promote excessive cracking of the isopropyl group and reduce the yield of dimethyl styrene.

Preferably, though not necessarily, an improved catalyst comprising 2 to 15% of an oxide of chromium, molybdenum, and/or vanadium supported on Activated Alumina is used. It is not necessary that only a single oxide be used. Mixed oxides of chromium, molybdenum and/or vanadium may be used and in some cases appear to be better suited for initiating and then carrying out dehydrogenation than a single oxide alone. When mixed oxides are used they may be deposited successively if so desired. However, if they are deposited on the carrier conjointly, the operational procedures are much simpler and the catalysts are apparently as good if not better for their intended purpose. These catalysts when used in the process of the present invention permit good yields with a minimum cracking.

The temperature at which the action is carried out may be varied within quite wide limits without departing from the scope of the present invention. p-Menthane, when vaporized and contacted for the correct time with a catalyst at above about 450° C. is dehydrogenated. There is an equilibrium between the hydrogen, dimethyl styrene, cymene and other reaction products so that conversion to dimethyl styrene can seldom, if ever be complete. The equilibrium conditions vary with the reaction temperature. From about 500–525° C. the product contains some 5% of dimethyl styrene. The dimethyl styrene content increases quite rapidly as the temperature is increased above 525° C. However, at above about 625° C. cracking causes sufficient loss of product so that any increase in conversion to dimethyl styrene is offset. Below about 450–475° C. very little, if any, dimethyl styrene is present in the reaction product.

The contact time needed is particularly important since it must be adequate for dehydrogenation but not long enough to permit excessive cracking. Within the 450–600° C. temperature range, from about one to twenty seconds are required. Sufficient time is required for the products to reach the practical dehydrogenation equilibrium. Extended contact has little advantage. If continued for enough time so that the dehydrogenation products themselves begin to crack appreciably, extended contact times may actually be disadvantageous.

One marked advantage of the present invention is that the catalyst may be readily reactivated. This is quite simply done by burning with air for a short period of time. A good cycle was found to be two hours dehydrogenation and one hour reactivation. The temperature rise in the hot zone is relatively small and the loss in catalytic activity even after a very large number of reactivations is not appreciable. Care should be taken not to allow the temperature during reactivation to become high enough to sinter the carrier when a supported catalyst is used. The sintering temperature of Activated Alumina, the preferred material is about 800–900° C. and therefore high enough so that this is not a practical limitation on the process.

It is also an advantage that the present invention is not limited to the use of any particular apparatus. The material to be treated must be vaporized and passed through the reaction vessel at a rate dependent upon the amount of catalytic mass being used. The reaction products may be collected by condensation and separated into their respective elements by fractional distillation. So long as these functions are performed, the design and exact structure of the apparatus may be varied at will. The development work was carried out using stainless steel reaction vessels. However, any material which is catalytically inactive, does not contaminate the materials and is resistant to intergranular attack by the hydrogen liberated during the reaction may be used.

The invention will be described in greater detail in conjunction with the following experimental work, which is illustrative only and not by way of limitation.

EXAMPLE 1

Several runs were made at varying temperatures to show the effect of temperature change on the dehydrogenation of p-menthane. The p-menthane used had a refractive index of $N_D^{20} = 1.4460$, an average specific gravity at 15.5° C. of 0.8077 and boiled at 169–170° C. The liquid material was fed at about 15 cc. per minute to a vaporizer pre-heated to about 400° C. and the pre-heated vapors passed over 1,000 cc. of 8–14 mesh Activated Alumina containing 10% by weight of chromium oxide. The results are shown in the following table:

Table I

| Av. cat. temp., °C. | Volume treated, mls. | Distillation analysis, per cent | | | | | Per cent liquid recovery |
|---|---|---|---|---|---|---|---|
| | | Per cent low boiler | Per cent p-menthane | Per cent p-cymene | Per cent dimethyl styrene | | |
| 400 | 1,850 | 6.1 | 51.4 | 14.4 | ---------- | | 63.0 |
| 450 | 1,950 | 4.8 | 47.5 | 20.4 | 2.7 | | 79.5 |
| 475 | 1,900 | 3.9 | 49.7 | 21.2 | 3.1 | | 80.7 |
| 500 | 1,900 | 2.2 | 50.0 | 33.2 | 4.8 | | 87.5 |
| 575 | 1,900 | 9.1 | 36.8 | 28.5 | 14.0 | | 76.5 |

EXAMPLE 2

The catalyst of Example 1 was replaced by a catalyst comprising 6% of molybdenum oxide on Activated Alumina. Using a liquid feed rate of about 20 cc. per minute, 1,000 cc. portions of the same p-menthane were treated at catalyst temperatures of about 525° C., 580° and 625° C. At 525° C. the product contained about 5% of dimethyl styrene which increased to nearly 20% at about 580° C. with a liquid recovery of about 88%. At 625° C., however, the dimethyl styrene content decreased to about 15% and the liquid recovery to about 70%. A corresponding increase in both off gas and low boilers was noted. 625° C. therefore appears to exceed the optimum catalyst temperature.

EXAMPLE 3

Example 2 was repeated using 1,000 cc. of an 8% vanadium oxide on Activated Alumina catalyst. This catalyst appeared to be effective at slightly lower temperatures than those of Examples 1 and 2, nearly 6% of dimethyl styrene using a catalyst temperature of about 525° C. This was increased slightly over three times at 600° C. but a decrease in liquid recovery and an increase in off gas indicated that this temperature probably exceeded the optimum.

In carrying out the process of the present invention cymene is present in the dehydrogenation products to the extent of some 20-40% of the recovered liquid. This may be treated in any desired manner. For example, if dimethyl styrene is the desired product, the "off gas" from the reaction may be collected and used to hydrogenate the cymene to menthane. The latter can then be recycled. Again the cymene may be used as feed in a separate reaction to make p-methyl and/or dimethyl styrene. Cymene itself is a commercially saleable compound, being useful for many purposes.

As pointed out above, the process of the present invention is particularly useful in conjunction with the processes of my copending applications for the conversion of terpenes to dimethyl styrene. In the catalytic processes of those applications, menthane is one of the reaction products. Yet it has now been found that p-menthane may be dehydrogenated to cymene and/or dimethyl styrene over the same catalysts as used in those processes, using similar contact times and approximately the same temperature ranges.

Consequently, it might be predicted that merely increasing the contact time, as for example in converting dipentene to dimethyl styrene as according to my copending application, Serial No. 491,939, no menthane would result. Unfortunately, this is not actually the case. For example only, in producing dimethyl styrene, such a procedure would require sufficient contact time between the terpene vapors and the catalyst for the formation of menthane and then to dehydrogenate. Such an extended contact time would result in a large proportion of any dimethyl styrene which formed concurrently with the menthane being lost by cracking.

However, the similarity between the conditions under which menthane may be dehydrogenated may be readily used to advantage if so desired. Menthane, from whatever source it may be obtained, may be blended with a terpene and used as feed in the processes of my copending applications. For example, the dipentene-menthane mixture may be used as a starting material for the production of either cymene or dimethyl styrene.

I claim:

1. A method of converting p-menthane in the vapor phase to dimethyl styrene which comprises vaporizing the p-menthane, passing the vaporized material over a dehydrogenation catalyst comprising a material selected from the group consisting of the oxides of chromium, molybdenum and vanadium and mixtures of the same at a temperature of about 450-600° C. using a contact time of from about 2-20 seconds, condensing the reacted vapors and separating the unreacted p-menthane, the p-cymene, and the dimethyl styrene fractions from the condensate.

2. A method of converting p-menthane in the vapor phase to dimethyl styrene which comprises vaporizing the p-menthane, preheating the vaporized material to about 350-450° C., passing the preheated material over a dehydrogenation catalyst comprising a material selected from the group consisting of the oxides of chromium, molybdenum and vanadium and mixtures of the same at a temperature of about 450-600° C. using a contact time of from about 2-20 seconds, condensing the reaction vapors and separating the unreacted p-menthane, the p-cymene, and the dimethyl styrene fractions from the condensate.

3. A process according to claim 2 in which the off gas is employed to hydrogenate the p-cymene portion to p-menthane and the latter is mixed with the unreacted p-menthane portion in the condensate as the latter is recycled.

4. A process according to claim 2 in which the catalyst comprises 2-15% of chromium oxide on a surface-active support.

5. A process according to claim 2 in which the catalyst comprises 2-15% of molybdenum oxide on a surface-active support.

6. A process according to claim 2 in which the catalyst comprises 2-15% of vanadium oxide on a surface-active support.

7. A process according to claim 2 in which the catalyst comprises 2-15% of chromium oxide on Activated Alumina support.

JAMES K. DIXON.